United States Patent [19]

Salem et al.

[11] Patent Number: 4,622,141
[45] Date of Patent: Nov. 11, 1986

[54] METHOD AND APPARATUS FOR WITHDRAWING A LAYER OF MATERIAL FROM A VESSEL

[75] Inventors: Eli Salem, Deal; Raymond J. Muller, Westfield; Stanley T. Stracey, Springfield, all of N.J.

[73] Assignee: The Graver Company, Union, N.J.

[21] Appl. No.: 665,560

[22] Filed: Oct. 29, 1984

[51] Int. Cl.⁴ .......................... B03B 5/64; B01J 49/00
[52] U.S. Cl. .................................. 210/189; 210/275; 210/290; 521/26
[58] Field of Search ................ 210/265, 189, 290, 275

[56] References Cited

U.S. PATENT DOCUMENTS

| | | | |
|---|---|---|---|
| 2,771,424 | 11/1956 | Stromquist et al. | 252/182 |
| 3,237,773 | 3/1966 | Laakso | 210/189 |
| 3,382,169 | 5/1968 | Thompson | 210/290 |
| 3,402,126 | 9/1968 | Cioffi | 210/35 |
| 3,414,508 | 12/1968 | Applebaum | 210/32 |
| 3,512,640 | 5/1970 | Hellmann | 210/189 |
| 3,527,718 | 9/1970 | Coburn | 260/2.1 |
| 3,582,504 | 6/1974 | Salem et al. | 260/2.1 |
| 3,719,591 | 3/1973 | Crits | 210/33 |
| 3,826,761 | 7/1974 | Short | 260/2.1 |
| 3,847,805 | 11/1974 | Voedisch | 210/189 |
| 4,039,443 | 8/1977 | Tahara et al. | 210/32 |
| 4,065,388 | 12/1977 | Flynn et al. | 210/80 |
| 4,191,644 | 3/1980 | Lembo | 210/33 |
| 4,228,001 | 10/1980 | Carlson | 210/189 |
| 4,298,696 | 11/1981 | Emmett | 210/189 |
| 4,349,442 | 9/1982 | Barraque et al. | 210/675 |

Primary Examiner—C. Warren Ivy
Attorney, Agent, or Firm—Dressler, Goldsmith, Shore, Sutker & Milnamow

[57] ABSTRACT

A method and apparatus is provided for holding first material along with less dense material in substantially separate layers and for effecting removal of at least some of the second material to a location displaced from the layer. The materials are arranged in the two layers with the first material at the bottom of a vessel and with the second material disposed above the first material. An elongate withdrawal conduit projects into the vessel to define (1) an exit port at the wall of the vessel, (2) a confined flow passageway communicating with the exit port within the vessel, and (3) at least one withdrawal aperture with the uppermost portion of any withdrawal aperture being lower than the uppermost portion of the exit port. The upper surface of the first material layer is maintained below the conduit while flow of the second material from the second material layer is effected into and through the conduit via the withdrawal aperture.

14 Claims, 12 Drawing Figures

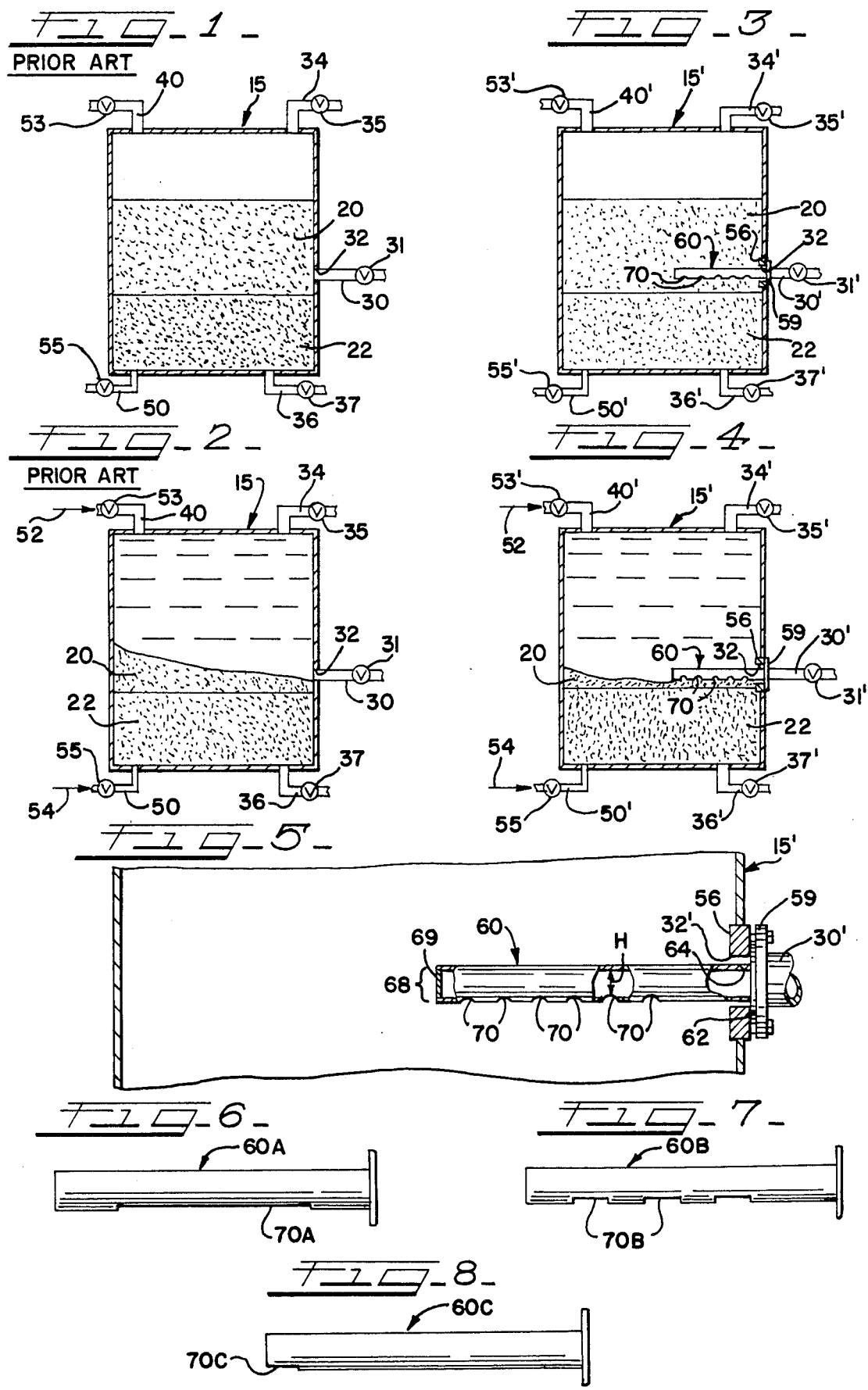

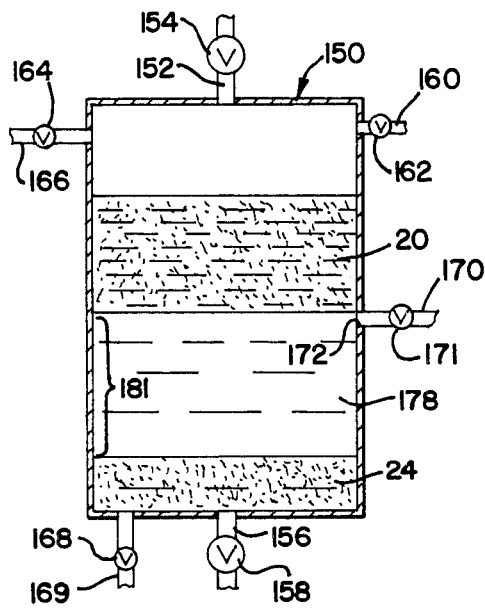
FIG_9_
PRIOR ART
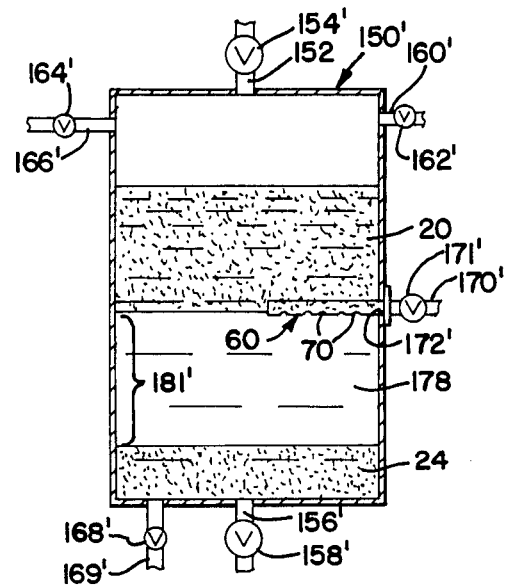
FIG_11_
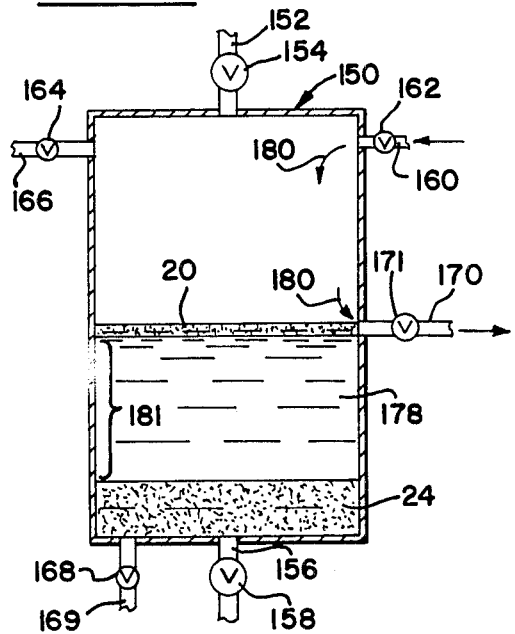
FIG_10_
PRIOR ART
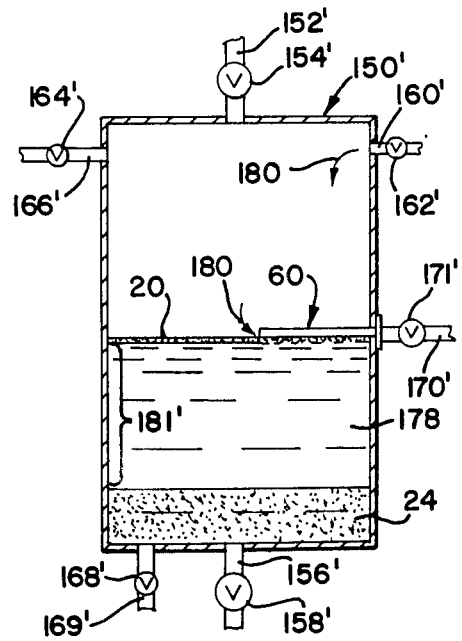
FIG_12_

METHOD AND APPARATUS FOR WITHDRAWING A LAYER OF MATERIAL FROM A VESSEL

TECHNICAL FIELD

This invention relates to the withdrawal of a layer of material from a vessel containing two or more layers of different materials. The present invention finds particular utility in the material transfer processes employed to arrange water purification mix-bed ion exchange resins prior to, and during, regeneration.

BACKGROUND OF THE INVENTION

Mixed bed ion exchange resin systems for purifying water are well known. The mixed bed of anion and cation exchange resin is typically regenerated from time-to-time, and, according to one conventional process, involves the separation of the anion resin from the cation resin for regeneration treatment. Such a conventional process is disclosed in the U.S. Pat. No. 3,582,504. An inventive modification of that process is disclosed in the U.S. Pat. No. 3,826,761.

Typically, the resins are arranged in a lower cation resin layer and an upper anion resin layer by hydraulic stratification in one process step in a first vessel and by floating one resin in an intermediate-density liquid in a subsequent process step in a second vessel. In each step, the anion resin is withdrawn from the anion resin layer through a pipe communicating with the vessel interior. Although such a procedure is generally satisfactory, not all of the anion resin can be initially withdrawn, and further processing steps may be required. This problem may be more or less significant, depending upon the size of the vessel and upon other parameters.

Accordingly, it would be desirable to provide a method and apparatus for permitting withdrawal of material, such as anion resin, from a vessel in a manner that would substantially eliminate, if not eliminate altogether, the tendency of some material to remain in the vessel. Further, it would be beneficial if such an improved system and apparatus employed relatively simple and inexpensive components.

SUMMARY OF THE INVENTION

An improved method and apparatus is provided for use with a vessel holding a first material along with a less dense second material in substantially separate layers and for permitting removal of a least some of the second material from the second material layer to a location displaced therefrom. The improved method is employed to withdraw the second material from the second material layer to a location exterior of the vessel.

In particular, the first material is arranged in a layer at the bottom of the vessel in a first material zone and the second material is arranged in a layer in a second material zone above the first material zone. An elongate withdrawal conduit is disposed within the vessel for discharging the second material from the second material layer through a wall of the vessel to the exterior of the vessel. The conduit projects into the vessel to define (1) a material exit port at the wall of the vessel, (2) a confined flow passageway communicating with the material exit port within the vessel, and (3) at least one material withdrawal aperture with the uppermost portion of the material withdrawal aperture being lower than the uppermost portion of the material exit port.

According the method, the upper surface of the first material layer is maintained below the conduit while the flow of the second material from the second material layer is effected into and through the conduit via the material withdrawal aperture.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, and in which like numerals are employed to designate like parts throughout the same, FIGS. 1 and 2 are simplified, sectional, diagrammatic, elevational views of a prior art process for withdrawing a material, such as anion resin particles, by means of sluicing;

FIGS. 3 and 4 are simplified, sectional, diagrammatic, elevational views of a first embodiment of the apparatus of the present invention operating according to a first embodiment of the method of the present invention to withdraw a material, such as anion resin particles, by sluicing;

FIG. 5 is a greatly enlarged, fragmentary, cross-sectional view showing one form of the conduit of the apparatus of the present invention with portions of the conduit broken away to better illustrate interior detail;

FIGS. 6-8 are elevational views of alternate forms of the conduit used in the apparatus of the present invention according to the method of the present invention;

FIGS. 9 and 10 are simplified, sectional, diagrammatic, elevational views of a prior art apparatus for withdrawing a layer of floating material, such as anion resin particles, by employing pressurized air; and FIGS. 11 and 12 are simplified, sectional, diagrammatic, elevational views of one form of the conduit in the apparatus of the present invention operating in accordance with the teachings of a second form of the method of the present invention.

DETAILED DESCRIPTION OF THE PREFERRED EMBODIMENTS

While this invention is susceptible of embodiment in many different forms, this specification and the accompanying drawings disclose only some specific forms as examples of the use of the invention. The invention is not intended to be limited to the forms or embodiments so described. The scope of the invention will be pointed out in the appended claims.

For ease of description, the apparatus of this invention is described in the normal (upright) operating position, and terms such as upper, lower, horizontal, etc., are used with reference to this position. It will be understood, however, that the apparatus of this invention may be manufactured, stored, transported, and sold in an orientation other than the position described.

The apparatus of this invention has certain conventional components, level control systems, and pressure control systems, the details of which, although not fully illustrated or described, will be apparent to those having skill in the art and an understanding of the necessary functions of such components. The precise shapes and sizes of the components herein described are not essential to the invention unless otherwise indicated.

The figures illustrating the preferred embodiments of the apparatus show structural details and conventional mechanical elements that will be recognized by one skilled in the art. However, detailed descriptions of such conventional elements are not necessary to an understanding of the invention, and accordingly, are not herein presented.

FIGS. 1 and 2 illustrate a conventional process in which two materials are separated. The process is specifically effected to separate ion exchange resins during one part of a conventional regeneration process. Such a typical conventional regeneration process, with certain improvements, is disclosed in the U.S. Pat. Nos. 3,582,504 and 3,826,761. The disclosures of these patents are incorporated herein by reference thereto to the extent that such disclosures are not inconsistent with the present disclosures.

FIGS. 1 and 2 illustrate a conventional vessel 15 for holding at least a first material, such as exhausted cation resin particles 22, in a first layer and for holding a second material, such as less dense, exhausted anion resin particles 20, in a second layer. The vessel 15 may be a separation/cation regeneration vessel defining a separation zone. Such a typical separation zone is disclosed in the above-identified U.S. Pat. Nos. 3,582,504 and 3,826,761 (wherein the zone is identified with the reference numeral 12).

Completely or partially exhausted cation and anion exchange resin particles are transferred from a service vessel (not illustrated) to the separation/cation regeneration vessel 15. A line 34 is provided for introducing the anion and cation resin particles 20 and 22, respectively, into the vessel 15. A line 36 is provided for withdrawing the cation resin particles 22 after regeneration. A shut-off valve 35 is provided in line 34 for occluding the line after the resin particles have been introduced into the vessel 15 and a shut-off valve 37 is provided in line 36.

The resin particles are statified in a conventional manner by passing liquid, ordinarily water, upwardly through the resin particles at a rate that is sufficient to stratify the resins by carrying the less dense anion resin particles 20 to a position above the heavier cation resin particles 22. FIG. 1 shows the resin particles in the stratified state at the completion of this step with the anion resin particles 20 in a layer on top of the layer of cation resin particles 22. The specific details of the conventional means and method for effecting such hydraulic stratification form no part of the present invention.

According to the conventional regeneration process, it is desired to remove the less dense anion resin particles 20 to an anion regeneration vessel (not illustrated in FIGS. 1 and 2) through a conduit 30. To this end, the conventional withdrawal conduit 30, in the form of a cylindrical, pipe with a shut-off valve 31, is disposed in an opening 32 in the wall of the vessel 15 and defines a generally circular exit port communicating with the interior of the vessel 15.

A sluicing liquid, such as water, is introduced into the vessel 15 through a line 40 communicating with the vessel 15 above the layer of anion resin particles 20 and through a line 50 communicating with the vessel 15 at the bottom of the layer of cation resin particles 22. The water entering the top of the vessel through line 40 is represented by the arrow 52 in FIG. 2 and the water entering the bottom of the vessel through line 50 is represented by the arrow 54 in FIG. 2.

In the conventional apparatus illustrated in FIGS. 1 and 2, the discharge or withdrawal pipe 30 is located so that the bottom of the pipe at the exit opening 32 is about two inches above the interface of the anion resin particles 20 and the cation resin particles 22. This is achieved by appropriate sizing of the vessel (e.g., height and cross-sectional configuration) relative to the fixed quantities of anion and cation resin particles that are used in the system.

The flow of water 54 through the bottom line 50 is sufficient to effect an upward flow of water through the cation resin particles 22 so that the total volume of interstitial voids within the cation resin particles will be increased somewhat. Typically, the layer of cation resin particles 22 "expands" slightly so that the top surface (i.e., the surface at the interface between the anion and cation resin particles) is raised about one-half inch. The raised surface of the top of the layer of cation resin particles 22 is then about 1½ inches below the bottom of the conventional withdrawal pipe 30 at the exit opening 32 in the wall of the vessel 15.

The flow rate of the water 52 introduced through the line 40 at the top of the vessel 15 is substantially greater than the flow rate of the water 54 introduced at the bottom of the vessel 15. The water flows 52 and 54 are both discharged through the withdrawal conduit 30. Since the cation resin particles 22 are maintained below the withdrawal pipe 30, only the anion resin particles 20 are carried with the water flow and are are sluiced out the vessel 15 as illustrated in FIG. 2. A shut-off valve 53 is provided in line 52 and a shut-off valve 55 is provided in line 54 for preventing flow through the lines except when effecting the above-described water introduction steps or when water introduction is otherwise desired.

Typically, some of the anion resin particles 20 remain in the vessel 15 as illustrated in FIG. 2. A small amount of the particles 20, near the vessel wall containing the exit opening 32, lies below the pipe 30. A small amount of anion resin particles 20 tends to slope upwardly with increasing distance from the withdrawal pipe 30 and remains in the vessel 15. Thus, when the cation resin particles 22 are next conventionally regenerated in the vessel 15, the quantity of anion resin particles 20 remaining in the vessel 15 will necessarily be subjected to the cation regeneration process instead of to the anion regeneration process. The present invention substantially reduces the quantity of remaining anion resin particles 20 as will be next be described with reference to FIGS. 3-8.

FIG. 3 shows a modified separation/cation regeneration vessel 15' having an upper water inlet line 40' with a valve 53' and a lower water inlet line 50' with a valve 55'. A line 34', with a shut-off valve 35', is provided for introducing the anion and cation resin particles 20 and 22, respectively. A line 36', with a shut-off valve 37', is provided for removing the cation resin particles 22.

A wall of the vessel 15' defines an exit opening 32' as best illustrated in the enlarged view in FIG. 5. The exit opening 32' is preferably defined in a thicker, reinforced portion 56 of the wall of the vessel 15'. A withdrawal pipe 30', having a shut-off valve 31', is connected at the opening 32', as with the conventional flange connection 59 illustrated, so as to communicate with the interior of the vessel 15'.

A novel elongate withdrawal conduit 60 is provided with a flange 62 mounted between the flange 59 of the pipe 30' and the vessel wall reinforced portion 52. The conduit 60 defines a resin particle exit port 64 at the wall of the vessel 15' within the vessel wall exit opening 32'. The conduit 60 projects in the vessel 15' from the vessel wall exit opening 32' at an elevation such that the upper surface of the layer of cation resin particles 22 is generally below the conduit 60.

The conduit 60 defines within the vessel 15' a confined flow passageway communicating with the resin particle exit port 64 within the vessel. In the embodiment illustrated in FIG. 5, the conduit 60 is a pipe having a generally hollow, cylindrical configuration, and the confined flow passageway is defined by the interior cylindrical surface of the pipe which, at the wall of the vessel 15', also necessarily defines the resin particle exit port 64. The conduit has a distal end 68 which is occluded across the transverse axial cross section of the conduit with a suitable disc-like member 69 to prevent ingress of gas or liquids.

In the preferred embodiment illustrated in FIG. 5, the exit port 64 is located in a portion of the wall of the vessel 15' which has a generally vertical orientation. The conduit 60 is generally horizontally disposed so that the upper surface of the layer of cation resin particles 22 is generally parallel with the conduit 60.

The conduit 60 also defines at least one resin particle withdrawal aperture 70. The embodiment of the conduit 60 illustrated in FIG. 5 has a plurality of apertures 70 in the form of vertically oriented bores arranged along the lower surface of the conduit. Regardless of the shape and location of the apertures 70, the uppermost portion (open region) of any withdrawal aperture 70 should be lower than the uppermost portion (open region) of the resin particle exit port 64. In the embodiment illustrated in FIG. 5, the uppermost portion of each withdrawal aperture 70 is located a distance H below the uppermost portion of the resin particle exit port 64 (i.e., the highest part of each aperture 70 is a distance H below the top inside surface of the conduit 60).

In one specific design that has been proposed, the conduit 60 may be provided in a vessel 15' having a diameter between about 72 inches and about 78 inches. The length of the conduit projecting inwardly of its flange 62 is about 21 inches. The conduit 60 is fabricated from two-inch schedule 40 pipe with a 0.12 inch thick disc 69 welded to the pipe distal end 68. Each resin particle withdrawal aperture 70 is a bore having a diameter of 1.125 inches. Six such bores are spaced apart on 2.5 inch centers with the bore closest to the wall of the vessel 15' being about 7 inches from the conduit flange 62. Preferably, the length of the conduit 60 projecting within the vessel 15' is at least about 25 percent of the vessel inside diameter.

The conduit 60 is preferably disposed within the vessel 15' so that it is positioned generally horizontally and so that the top of the layer of cation resin particles 22 will be between about one and about two inches below the bottom exterior surface of the conduit 60. Thus, the bottom of the layer of anion resins particles 20 in the vessel 15' will necessarily be below the top exterior surface of the conduit 60.

In operation, the water flows 52 and 54 are introduced into the vessel 15' through valve 53' in line 40' and through valve 55' in line 50', respectively. These flows are controlled in the same manner as described above with respect to the prior art apparatus illustrated in FIGS. 1 and 2. The combined water flows sluice the anion resin particles 20 through the withdrawal apertures 70 of the conduit 60 and out of the vessel 15'. Since the apertures 70 are in the bottom portion of the horizontally disposed conduit 60, and the since the conduit 60 projects inwardly over a substantial portion of the cation resin particles 22, a significantly reduced quantity of anion resin particles 20 remains in the vessel 15' at the completion of the sluicing process.

The conduit 60 may be modified as illustrated in FIGS. 6–8. FIG. 6 shows a conduit 60A having a single, elongate aperture or slot 70A along the bottom of the conduit. FIG. 7 shows a conduit 60B having a plurality of slots 70B in the bottom portion of the conduit. FIG. 8 illustrates a conduit 60C having a single slot 70C at the distal end of the conduit.

Preferably, the cross-sectional flow area of the resin particle withdrawal apertures (70, 70A, 70B, or 70C) is substantially equal to, or greater than, the cross-sectional flow area of the resin particle exit port 64 in the conduit at the wall of the vessel 15' so as to accommoodate the desired flow. In the preferred embodiments of the conduits (60, 60A, 60B, and 60C), each withdrawal aperture (70, 70A, 70B, and 70C) is defined in a portion of the conduit that is below the elevation of the longitudinal axis of the conduit when the conduit is horizontally disposed.

The novel withdrawal conduit 60 may be employed in other vessels for witndrawing a layer of material, including for withdrawing a floating layer of material. A specific application is illustrated in FIGS. 11 and 12 which illustrate a system that is an improvement over a conventional prior art system illustrated in FIGS. 9 and 10.

The systems illustrated in FIGS. 9–12 can be specifically employed to separate cation resin particles or fines from less dense anion resin particles 20. Typically, the layer of anion resin particles 20 that is removed from the separation/cation regeneration vessel (vessel 15 in FIG. 2 or vessel 15' in FIG. 4) contains a small amount of fine cation resin particles. Typically, the cation resin particles are very line particles that have been carried upwardly into the layer of anion resin particles 20 and that remain mixed with the anion resin particles 20. When the layer of anion resin particles 20 is transferred from the separation/cation regeneration vessel to another vessel for regeneration of the anion resin particles 20, the fine cation resin particles are necessarily also transferred with the anion resin particles 20. While regenerating or otherwise treating the transferred layer of anion resin particles 20, it is desired to remove even the small amount of line cation resin particles from the transferred layer of anion resin particles 20.

The above-mentioned U.S. Pat. Nos. 3,582,504 and 3,826,761 disclose a method for removing fine cation resin particles in an anion resin particle regeneration/contaminant separation zone vessel. In each of those patents, FIG. 3 illustrates the transferring of anion resin particles 20, with some cation resin particle fines carried therein, to a contaminant separation zone 14 in a contaminant separation zone/anion regeneration vessel. That same vessel is illustrated in the present disclosure as prior art in FIGS. 9 and 10 wherein the vessel is designated generally by the reference numeral 150.

With continued reference to FIGS. 9 and 10 of the present disclosure, a line 152 is provided for introducing the anion resin particles 20, along with the fine cation resin particles carried therein, into the vessel 150. A valve 154 is provided in line 152.

A line 156 is provided at the bottom of the vessel 150 for withdrawing the fine cation resin particles after they have been separated by a process described hereinafter. A valve 158 is provided in the discharge line 156.

A line 160 communicates with the interior of the vessel 150, through a shut-off valve 162, for supplying a pressurized gas, such as air, for purposes described in detail hereinafter.

A line 166, with a valve 164, is provided in the top of the vessel 150 for introducing a liquid as described in detail hereinafter. A line 169, with a valve 168, is provided at the bottom of the vessel 150 for discharging the liquid.

Finally, a conventional withdrawal conduit 170, in the form of a cylindrical pipe, is disposed in an opening 172 in the wall of the vessel 150 and defines a generally circular exit port 172 communicating with the interior of the vessel 150. The conduit 170 preferably includes a shut-off valve 171.

According to the conventional prior art process, as illustrated generally in FIG. 9, the anion resin particles 20 are transferred to the vessel 150 along with any fine cation resin particle carry-over. The resin particles are introduced into the vessel 150 through line 152 and open valve 154 while the following valves are closed: valve 164 in the inlet line 166, valve 162 in gas line 160, valve 171 in discharge line 170, valve 168 in the outlet line 169, and valve 158 in the five cation resin particle discharge line 156.

After the resin particles have been introduced through line 152 into the vessel 150, the valve 154 is closed and the valve 164 in line 166 is opened to introduce an intermediate-density liquid 178. The intermediate-density liquid 178 causes the anion exchange resin 20 to float while the fine cation resin particles sink to the bottom of the vessel 150 to form a layer 24. Preferably, a sufficient amount of intermediate-density liquid 178 is delivered to the vessel 150 to produce a separation or gap containing only liquid between the anion resin particles 20 and the fine cation resin particle layer 24. This gap is illustrated in FIGS. 9 and 10 by reference numeral 181.

Preferably, the intermediate-density liquid 178 is delivered downwardly through the anion resin particles 20 for a period of time sufficient to agitate the particles, and to remove any diluents from the floating layer of anion resin particles 20, in order to be certain that the intermediate-density liquid 178 is of the proper density.

In the conventional prior art process illustrated in FIGS. 9 and 10, the intermediate-density liquid 178 is typically an aqueous solution of sooium hydroxide. Such an intermediate-density liquid 178 performs the dual function of (1) separating the fine cation resin particles from the anion resin particles and (2) regenerating the anion resin particles 20.

After the fine cation resin particles have been separated from the anion resin particles 20 to form the layer 24, and after the anion resin particles 20 have been regenerated, the floating anion resin particles 20 can be transferred as described hereinafter to a conventional holding tank (not illustrated) for being re-mixed with regenerated cation resin particles. Also, the fine cation resin particles in layer 24 are transferred from the vessel 150 to an empty separation/cation regeneration vessel (e.g., vessel 15 in FIGS. 1 and 2) where the fine cation resin particles will be mixed with the next batch of exhausted resin.

The floating layer of anion resin particles 20 (which no longer contains the fine cation resin particles that have substantially settled out) is first withdrawn from the vessel 150 while the fine cation resin particle layer 24 remains in the bottom of the vessel. Removal of the anion resin particles 20 is effected according to the conventional prior art process illustrateo in FIGS. 9 and 10 by opening the valve 171 in the conduit 170 and forcing the anion resin particles 20 out through the conduit 170. To this end, the valve 162 in the gas inlet line 160 is opened, and the interior of the vessel 150 is pressurized with a suitable gas (e.g., air). The gas pressure forces the intermediate-density liquid 178, in which the anion resin particles 20 float, out of the vessel 150 through the conduit 170.

The layer of anion resin particles 20 decreases in thickness as this occurs until the top of the layer of the anion resin particles 20 reaches the level of the open ended conduit 170 at the wall of the vessel 150. At this point, air begins to flow through the conduit 170 as indicated by flow arrow 180 in FIG. 10. At this point, further substantial discharge of the floating layer of anion resin particles 20 terminates. As a result, a thin layer of anion resin particles 20 remains in the vessel 150.

Prior attempts to remove more of the anion resin particles 20 have involved changing the density of the intermediate fluid 178 and repeatedly introducing the intermediate-density fluid 178 into the vessel 150 to raise the remaining anion resin particles 20 above the open end of the conduit 170. However, such attempts involve more complex operating steps and are not completely satisfactory for all systems, especially those with large diameter vessels.

According to the present invention, the novel conduit 60 described above with reference to FIGS. 3-8 may be employed to more efficiently remove a layer of floating material, especially anion resin particles 20. The use of the novel conduit 60 to remove a floating layer of anion resin particles 20 in accordance with the teachings of the present invention is illustrated in FIGS. 11 and 12.

The apparatus in FIGS. 11 and 12 includes a vessel 150' which is substantially identical to the prior art vessel 150 described above with reference to FIGS. 9 and 10. The vessel 150', employing the novel conduit 60 in accordance with the teachings of the present invention, is illustrated in FIGS. 11 and 12 as containing many components that are identical or functionally analagous to those of the conventional prior art vessel 150.

The components of vessel 150' that are identical or functionally analagous to those of the conventional prior art vessel 150 are designated by reference numerals identical to those used for the conventional prior art vessel 150 components with the exception that the vessel 150' component reference numerals are followed by a prime mark whereas the reference numerals designating the components of the prior art vessel 150 have no prime marks. The identical or analagous components employed in the vessel 150' with the novel conduit 60 are not specifically further described.

The elongate withdrawal conduit 60 may have tne same structure and configuration as illustrated in FIG. 5 and as described above with reference to the first embodiment of the apparatus of the present invention. The withdrawal conduit may also have other forms, including any of the forms illustrated in FIGS. 6-8 as described above.

In any event, the withdrawal conduit 60 is disposed within the vessel 150' and projects into the vessel to define (1) an exit port (port 64 in FIG. 5) at the wall of the vessel, (2) a confined flow passageway communicating with the exit port within the vessel, and (3) at least one withdrawal aperture 70 (FIGS. 5 and 11) with the uppermost portion of any withdrawal aperture 70 being lower than the uppermost portion of the exit port 64.

The upper surface of the first or settled out layer of material, such as the fine cation resin particle layer 24, is maintained below the withdrawal conduit 60 while effecting the flow of the second (floating) material, such as the anion resin particles 20, into and through the withdrawal conduit 60 via the withdrawal apertures 70.

The upper surface of the settled out fine cation resin particle layer 24 is maintained below the conduit 60 by (1) employing a suitable intermediate-density liquid 178 in which the fine cation resin particles will settle out and (2) by locating the withdrawal conduit 60 at an elevation in the vessel 150' that will always be higher than the settled out fine cation resin layer 24 for any anticipated amount of such settled out particles.

Preferably, the process is efficiently carried out by delivering to the vessel 150' an amount of the intermediate-density liquid 178 that is sufficient to float the anion resin particles 20 so that the bottom surface of the layer of floating anion resin particles 20 is located at an elevation at least equal to, or slightly greater than, the elevation of the uppermost portion of the resin particle withdrawal apertures 70. Also, the process is efficiently carried out if the conduit 60 is disposed in a generally horizontal orientation parallel to the bottom surface of the layer of anion resin particles 20. Preferably, the conduit 60 also extends into the vessel for distance that is at least 25% of the vessel inside diameter.

When the vessel 150' is pressurized with a suitable gas through the line 160', the intermediate density liquid 178 and the anion resin particles 20 floating therein are discharged through the apertures 70 in the conduit 60. Since the uppermost portion of any aperture 70 is lower than the uppermost portion of the exit port 64 (FIG. 5), the gas effects a discharge of the anion resin particles 20 to a lower level within the vessel 150' than is possible with the conventional vessel withdrawal pipe 170 illustrated in FIG. 10. As a result, substantially all of the anion resin particles 20 can be removed by simple pressure discharge. At worst, a very thin layer of anion resin particles 20 may remain in the vessel 150', but the remaining amount is so little that its removal is either not required or can be effected by introducing a small additional quantity of the intermediate-density liquid 178.

It will be readily observed from the foregoing detailed description of the invention and from the illustrated embodiments thereof that numerous variations and modifications may be effected without departing from the true spirit and scope of the novel concepts or principles of this invention.

What is claimed is:

1. An apparatus for holding exhausted cation resin particles along with less dense anion resin particles in substantially separate layers and for removing at least some of the resin particles from at least said anion resin particle layer to a location exterior of said vessel, said apparatus including:
   a vessel for containing a layer of said cation resin paricles in a cation zone at the bottom of said vessel and for containing a layer of said anion resin particles in an anion zone above said cation zone;
   inlet means to said vessel for introducing said anion and cation resin particles into said vessel;
   means for effecting a flow of fluid through said resin particles to stratify said resin particles in said layers;
   an elongate withdrawal conduit for discharging said anion resin particles from said anion particle layer through a wall of said vessel to the exterior of said vessel, said conduit projecting into said vessel above the bottom of the vessel and being substantially horizontally disposed at an elevation above and substantially parallel to said layer of cation resin particles, said conduit defining an exit port at the wall of said vessel for accommodating the discharge of said anion resin particles out of said vessel, the interior of said conduit defining within said vessel a flow passageway extending from said exit port to the end of the conduit within said vessel, and said conduit also defining at least one downwardly opening resin particle withdrawal aperture with the uppermost portion of any said resin particle withdrawal aperture being lower than the uppermost portion of said resin particle exit port; and
   means for introducing a fluid into said vessel to move resin particles from said anion resin particle layer into and through said conduit via said withdrawal aperture.

2. The apparatus in accordance with claim 1 in which said conduit is disposed in said vessel at an elevation such that the uppermost portion of said resin particle withdrawal aperture is at the bottom of said layer of said anion resin particles.

3. The apparatus in accordance with claim 1 in which said conduit has a hollow, cylindrical configuration.

4. The apparatus in accordance with claim 1 in which said vessel wall at which said exit port is located has a vertical orientation and in which said exit port is circular.

5. The apparatus in accordance with claim 1 in which said conduit is a pipe having a distal end within said vessel occluded across the transverse axial cross section of the pipe.

6. The apparatus in accordance with claim 1 in which said conduit is a length of cylindrical pipe disposed in said vessel in a horizontal orientation so that the upper surface of said layer of cation resin particles is parallel with said pipe and in which the wall of said pipe defines at least one of said withdrawal apertures.

7. The apparatus in accordance with claim 6 in which each said withdrawal aperture is defined by a portion of the wall of said pipe below the elevation of the longitudinal axis of the pipe.

8. The apparatus in accordance with claim 7 in which at least one of said withdrawal apertures is a bore.

9. The apparatus in accordance with claim 7 in which at least one of said withdrawal apertures is a slot.

10. The apparatus in accordance with claim 7 in which said pipe wall defines a plurality of said apertures arranged in a spaced-apart array along the length of said pipe.

11. The apparatus in accordance with claim 1
   in which the vessel wall defining said exit port has a cylindrical configuration oriented with the longitudinal axis substantially vertical, and
   in which said conduit has a length in said vessel that is at least 25 percent of the vessel inside diameter.

12. The apparatus in accordance with claim 1 in which said conduit is disposed in said vessel at an elevation such that the top of said layer of said cation resin particles is between about 1 and about 2 inches below the bottom exterior surface of said conduit.

13. In an apparatus for holding exhausted cation resin particles along with less dense anion resin particles in substantially separate layers and for removing at least some of the resin particles from at least said anion resin particle layer to a location displaced therefrom, which apparatus includes (1) a single vessel for containing a layer of said cation resin particles in a cation zone at the bottom of said vessel as well as for containing a layer of said anion resin particles in an anion zone above said cation zone, (2) inlet means to said vessel for introducing said anion and cation resin particles into said vessel, (3) means for effecting flow of fluid through said resin particles to stratify said resin particles in said layers, and (4) means for introducing a fluid into said vessel to move said resin particles from said anion resin particle layer to an exit opening in the wall of said vessel, said apparatus further comprising:

an elongate withdrawal conduit for discharging said anion resin particles from said anion particle layer through a wall of said vessel to the exterior of said vessel, said conduit projecting into said vessel from said vessel wall exit opening above the bottom of the vessel and being substantially horizontally disposed at an elevation above and substantially parallel to said layer of cation resin particles, said conduit defining an exit port at the wall of said vessel within said vessel wall exit opening for accommodating the discharge of said anion resin particles out of said vessel, the interior of said conduit defining within said vessel a flow passageway extending from said resin particle exit port to the end of the conduit within said vessel, and said conduit also defining at least one downwardly opening resin particle withdrawal aperture with the uppermost portion of any said resin particle withdrawal aperture being lower than the uppermost portion of said resin particle exit port.

14. In an apparatus for holding a first material along with less dense second material in substantially separate layers and for removing at least some of the second material from at least said second material layer to a location displaced therefrom, which apparatus includes (1) a single vessel for containing a layer of said first material in a first material zone at the bottom of said vessel as well as for containing a layer of said second material in a second material zone above said first material zone, (2) inlet means to said vessel for introducing said first and second materials into said vessel, (3) means for effecting a flow of fluid through said materials to stratify said materials in said layers with said first material layer having an upwardly facing substantially horizontal surface below said second material layer, and (4) means for introducing a fluid into said vessel to move said second material from said second material layer to an exit opening in the wall of said vessel, said apparatus further comprising:

an elongate withdrawal conduit for discharging said second material from said second material layer through a wall of said vessel to the exterior of said vessel, said conduit projecting into said vessel from said vessel wall exit opening above the bottom of the vessel and being substantially horizontally disposed at an elevation such that said upwardly facing surface of said first material layer is below and substantially parallel to said conduit, said conduit defining an exit port at the wall of said vessel within said vessel wall exit opening for accommodating the discharge of said second material out of said vessel, the interior of said conduit defining within said vessel a flow passageway extending from said exit port to the end of said conduit within said vessel, and said conduit also defining at least one downwardly opening withdrawal aperture with the uppermost portion of any said withdrawal aperture being lower than the uppermost portion of said exit port.

* * * * *